US007168177B2

(12) United States Patent
Kwon et al.

(10) Patent No.: US 7,168,177 B2
(45) Date of Patent: Jan. 30, 2007

(54) METHOD AND APPARATUS FOR DETERMINING A GEOMAGNETIC FIELD BY USING A COMPASS AND METHOD AND APPARATUS FOR DETERMINING AN AZIMUTH ANGLE OF A MOVING OBJECT USING THE SAME

(75) Inventors: Woong Kwon, Gyeonggi-do (KR); Kyung-shik Roh, Gyeonggi-do (KR); Woo-sup Han, Gyeonggi-do (KR); Young-bo Shim, Seoul (KR); Sang-on Choi, Gyeonggi-do (KR); Ki-cheol Park, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 168 days.

(21) Appl. No.: 11/049,860

(22) Filed: Feb. 4, 2005

(65) Prior Publication Data

US 2005/0183275 A1 Aug. 25, 2005

(30) Foreign Application Priority Data

Feb. 4, 2004 (KR) ............. 10-2004-0007231

(51) Int. Cl.
*G01C 17/28* (2006.01)
(52) U.S. Cl. .................... 33/361; 33/355 R
(58) Field of Classification Search ........ 33/351–352, 33/355 R, 361, 356–357; 324/252
See application file for complete search history.

(56) References Cited

U.S. PATENT DOCUMENTS

| 4,143,467 | A | * | 3/1979 | Erspamer et al. ............. 33/356 |
| 5,187,872 | A | * | 2/1993 | Dufour ........................ 33/356 |
| 7,069,663 | B2 | * | 7/2006 | Kwon et al. ................. 33/356 |
| 2005/0126023 | A1 | * | 6/2005 | Kwon et al. ................. 33/356 |
| 2005/0223575 | A1 | * | 10/2005 | Fillatreau et al. ............. 33/356 |

FOREIGN PATENT DOCUMENTS

JP      2003-65791      3/2003

OTHER PUBLICATIONS

Stergios I. Roumeliotis et al., "Circumventing Dynamic Modeling: Evaluation of the Error-State Kalman Filter Applied to Mobile Robot Localization", Proceedings of the 1999 IEEE International Conference of Robotics & Automation, Detroit, Michigan, May 1999, pp. 1656-1663.
Sheng-Wu Liu et al., "Research on High Preceision Intelligent Digital Magnetic Heading System", Proceedings of the 1994 IEEE International Conference on Industrial Technology, 1994, pp. 734-737.
Korean Office Action dated Jun. 28, 2005, and English translation.

* cited by examiner

*Primary Examiner*—Yaritza Guadalupe-McCall
(74) *Attorney, Agent, or Firm*—Buchanan Ingersoll & Rooney PC

(57) ABSTRACT

There are provided a method and apparatus for determining a geomagnetic field by using a compass and a method and apparatus for determining an azimuth angle of a moving object using the method and apparatus for determining a geomagnetic field. The method of determining a geomagnetic field by using a compass includes defining an allowable magnetic field range used to determine a valid geomagnetic region; calculating a magnitude of a magnetic field in a geomagnetic-field validity test region by using a compass; and if the magnitude of the magnetic field is within the allowable magnetic field range, determining that the geomagnetic-field validity test region is the valid geomagnetic region, and if not, determining that there is applied an external magnetic field disturbance. Accordingly, since an error of an azimuth angle of the compass due to an external magnetic field disturbance can be determined, it is possible to accurately detect a valid azimuth angle of the compass. In addition, since an allowable magnetic field range is determined based on a variation of magnetic field detected by a compass rather than a conventional method that simply compares a magnetic field and a geomagnetic field, it is possible to accurately determine the geomagnetic field.

25 Claims, 9 Drawing Sheets

(x, y, θ)

INDOORS

☐ : POSITION OF MOVING ROBOT

⌒ : MAGNETIC FIELD

||| : GEOMAGNETIC FIELD

METHOD AND APPARATUS FOR DETERMINING A GEOMAGNETIC FIELD BY USING A COMPASS AND METHOD AND APPARATUS FOR DETERMINING AN AZIMUTH ANGLE OF A MOVING OBJECT USING THE SAME

BACKGROUND OF THE INVENTION

Priority is claimed to Korean Patent Application No. 10-2004-0007231, filed on Feb. 4, 2004, in the Korean Intellectual Property Office, the disclosure of which is incorporated herein in its entirety by reference.

1. Field of the Invention

The present invention relates to a method and apparatus for determining a geomagnetic field and a method and apparatus for determining an azimuth angle of a moving object using the same, and more particularly, to a method and apparatus for determining a geomagnetic field by using a compass and a method and apparatus for determining an azimuth angle of a moving object using the same.

2. Description of the Related Art

Pose estimation is necessary to an intelligent moving object such as a robotic vehicle. The pose estimation is performed by using absolute sensors or relative sensors. As shown in FIG. 1, the pose estimation of the object moving on a plane is to estimate a position (x, y) and an orientation angle θ of the object. That is, the term "pose" denotes position and orientation. The pose estimation of a stationary object is a specific one of the pose estimations of a moving object. Therefore, a stationary object is considered to be a moving object without loss of generality.

Examples of the absolute sensors for detecting an absolute position or pose of an object such as a robot include a camera, a laser scanner, a sonar sensor, a global positioning system (GPS), and a compass. On the other hand, examples of the relative sensors for measuring variations of a relative position of an object and integrating the variations to estimate a position or pose include a gyro, an accelerometer, and an odometer, which is a kind of an encoder provided to a motor.

These sensors have their own disadvantage as well as advantages. The camera is so sensitive to ambient brightness that inaccurate data may be obtained. The laser scanner can obtain somewhat accurate data, but its price is very high. In addition, in a case where there are a lot of obstacles, the laser scanner is not useful. The sonar has a low accuracy. The GPS can be used only outdoors, and its accuracy is low. On the other hand, the relative sensors are essentially involved in an integration error because the variations obtained by the relative sensors need to be integrated. In addition, the gyro and accelerometer have their own drift errors. Therefore, in order to compensate for disadvantages of the sensors, sensor fusion of multiple sensors has been developed and used for the pose estimation of the moving object.

On the other hand, the compass is a sensor for indicating a magnetic north at any place on the earth. Therefore, an azimuth angle of the object can stably be obtained with the compass. Furthermore, by using sensor fusion of the compass with other sensors, pose estimation of the moving object such as the robot can be more stably performed. However, since there is generally external magnetic field disturbances at home and office, the azimuth angle detected by the compass may be distorted. Therefore, approaches to coping with the distorted azimuth angle have been needed.

Various approaches to coping with the distorted azimuth angle of the compass due to the external magnetic field disturbance have been proposed. For example, there are methods of modeling a compass to obtain an azimuth angle of the compass. However, validities of the methods have not been proved with any experiments. An example of the method is disclosed in an article by Wang Hung-de Deng, titled "Research on High Precision Intelligent Digital Magnetic Heading System," at Proceedings of the IEEE International Conference on Industrial Technology (1994), p 734–737, 1994.

In addition, there are methods using sensor fusion of a compass with other sensors. However, in these methods, the distortion of the azimuth angle of the compass due to an external magnetic field disturbance is not considered. An example of the method using the sensor fusion is disclosed in an article by Roumeliotis S. I., Sukhatme G. S., and Bekey, G. A, titled "Circumventing Dynamic Modeling: Evaluation of the Error-state Kalman Filter Applied to Mobile Robot Localization," at Proceedings of IEEE International Conference on Robotics and Automation (1994), p 1656–1663, 1999.

SUMMARY OF THE INVENTION

Embodiments of the present invention provide a method and apparatus for determining a geomagnetic field by using a compass to determine a validity of an azimuth angle detected by the compass and determine whether or not a moving object is located at a valid geomagnetic region in order to perform pose estimation.

The present invention also provides a method and apparatus for determining an azimuth angle of a moving object using a method and apparatus for determining a geomagnetic field by using a compass.

According to an aspect of the present invention, there is provided a method of determining a geomagnetic field by using a compass, comprising: defining an allowable magnetic field range used to determine a valid geomagnetic region; calculating a magnitude of a magnetic field in a geomagnetic-field validity test region by using a compass; and if the magnitude of the magnetic field is within the allowable magnetic field range, determining that the geomagnetic-field validity test region is the valid geomagnetic region, and if not, determining that there is applied an external magnetic field disturbance.

The defining of the allowable magnetic field range may comprise: (a1) detecting time trajectory of orthogonal (x and y axes) components of the magnetic field in a presumed geomagnetic region while the compass rotates; (a2) calculating amplitudes and offsets of a geomagnetic field by using maximum and minimum values of the horizontal and vertical components of the magnetic field; (a3) if the time trajectory of magnetic field has an approximately sinusoidal wave form, selecting a current position of the compass as a candidate position used to define the allowable magnetic-field range, and if not, changing the position of the compass to perform the operations (a1) to (a3); (a4) generating a candidate position group having a predetermined number of candidate positions by repeating the operations (a1) to (a3); (a5) calculating mean and variance values of the amplitudes and offsets of the geomagnetic fields at the candidate positions of the candidate position group; and (a6) obtaining the allowable magnetic-field range by calculating upper and lower limits of the magnitudes of the geomagnetic fields from the amplitudes and offsets.

The operation (a4) may further comprise comparing the amplitudes and offsets of the geomagnetic fields at the candidate positions and eliminating candidate positions having more than predetermined amplitudes and offsets from the candidate position group.

The upper and lower limits of the geomagnetic fields of the operation (a6) may be obtained by: calculating the magnitude |H| of the magnetic field from the horizontal and vertical components Hx and Hy of the magnetic field, the amplitudes Ax and Ay, and the offsets Ox and Oy by using Equation 3:

$$|H|^2 = \left(\frac{H_x - O_x}{A_x} \times |H_E|\right)^2 + \left(\frac{H_y - O_y}{A_y} \times |H_E|\right)^2, \quad \text{[Equation 3]}$$

wherein $|H_E|$ is a magnitude of the geomagnetic field;

representing the magnitude |H| with errors $\Delta A_x$ and $\Delta A_y$ between the amplitudes Ax and Ay and real amplitudes $\hat{A}x$ and $\hat{A}y$ in a real geomagnetic region by using Equation 4:

$$|H|^2 = \left(\frac{H_x - O_x}{\hat{A}_x + \Delta A_x} \times |H_E|\right)^2 + \left(\frac{H_y - O_y}{\hat{A}_y + \Delta A_y} \times |H_E|\right)^2 \quad \text{[Equation 4]}$$

wherein the errors $\Delta A_x$ and $\Delta A_y$ have ranges represented by Equations 5 and 6, respectively:

$$-\gamma\hat{A}_x \leq \Delta A_x \leq \gamma\hat{A}_x \quad \text{[Equation 5]}$$

$$-\gamma\hat{A}_y \leq \Delta A_y \leq \gamma\hat{A}_y, \quad \text{[Equation 6]}$$

wherein $\gamma$ is a constant associated with allowable limits of the real amplitudes $\hat{A}x$ and $\hat{A}y$ and has a value of 0 to 1;

obtaining the allowable magnetic-field range represented by Equation 7 by using Equations 4, 5, and 6;

$$\frac{1}{(1+\gamma)^2}\left(\left(\frac{H_x - O_x}{\hat{A}_x} \times |H_E|\right)^2 + \left(\frac{H_y - O_y}{\hat{A}_y} \times |H_E|\right)^2\right) \leq |H|^2 \leq \quad \text{[Equation 7]}$$

$$\frac{1}{(1-\gamma)^2}\left(\left(\frac{H_x - O_x}{\hat{A}_x} \times |H_E|\right)^2 + \left(\frac{H_y - O_y}{\hat{A}_y} \times |H_E|\right)^2\right)$$

obtaining the allowable magnetic-field range represented by Equation 8 from Equation 7, $$\frac{1}{1+\gamma}|H_E| \leq |H| \leq \frac{1}{1-\gamma}|H_E|. \quad \text{[Equation 8]}$$

The defining of the allowable magnetic-field range may be performed at a time of manufacturing the compass.

According to another aspect of the present invention, there is provided a method of determining a geomagnetic field by using at least two compasses, comprising: (a) defining at least two allowable magnetic field ranges used to determine a valid geomagnetic region for the at least two compasses; (b) calculating a magnitude of a magnetic field in a geomagnetic-field validity test region by using the at least two compasses; and (c) if the magnitude of the magnetic field is within the at least two allowable magnetic field ranges, determining that the geomagnetic-field validity test region is the valid geomagnetic region, and if not, determining that there is applied an external magnetic field disturbance.

The two compasses may be used, and the operation (c) may comprise: (c1) if the magnitude of the magnetic field is not within one of the two allowable magnetic field ranges, determining that there is applied the external magnetic field disturbance; and (c2) if the magnitude of the magnetic field is within both of the allowable magnetic field ranges, calculating a difference between magnitudes of magnetic fields detected by the two compasses, and if the difference is more than a predetermined value, determining that the geomagnetic fields of the compasses are not valid, and if not, determining that the geomagnetic fields of the compasses are valid.

The operation (c2) may comprise: (c2-1) if the magnitude of the magnetic field is within both of the allowable magnetic field ranges, calculating a difference between magnitudes of magnetic fields detected by the two compasses, and if the difference is more than a predetermined value, determining that the geomagnetic fields of the compasses are not valid; (c2-2) if the difference is not more than the predetermined value, calculating upper and lower limits of azimuth angles of the two compasses from data of the magnetic field detected by the two compasses; and (c2-2) determining whether or not the azimuth angles of the two compasses are valid by using upper and lower limits of the azimuth angles of the two compasses.

The upper and lower limits of the two compasses may be obtained by: calculating the azimuth angles of the compasses from the magnetic fields detected by the two compasses by using Equation 8:

$$\theta_{ci} = \arctan\left(\frac{\frac{H_{xi} - O_{xi}}{A_{xi}}}{\frac{H_{yi} - O_{yi}}{A_{yi}}}\right) = \arctan\left(\frac{A_{yi}(H_{xi} - O_{xi})}{A_{xi}(H_{yi} - O_{yi})}\right), \quad \text{[Equation 9]}$$

wherein i indicates the two compasses and is 1 and 2;

if a compass-installed object or robot is located in a geomagnetic region, obtaining upper and lower limits of ratios of real amplitudes in the geomagnetic region represented by Equation 13:

$$\frac{1-\gamma}{1+\gamma}\frac{A_{yi}}{A_{xi}} \leq \frac{\hat{A}_{yi}}{\hat{A}_{xi}} \leq \frac{1+\gamma}{1-\gamma}\frac{A_{yi}}{A_{xi}}; \quad \text{[Equation 13]}$$

when constants $\beta_i$ and $\hat{\beta}_i$ are defined by Equation 14:

$$\beta_i \equiv \frac{A_{yi}(H_{xi} - O_{xi})}{A_{xi}(H_{yi} - O_{yi})}, \quad \hat{\beta}_i \equiv \frac{\hat{A}_{yi}(H_{xi} - O_{xi})}{\hat{A}_{xi}(H_{yi} - O_{yi})}, \quad \text{[Equation 14]}$$

if $H_{xi} - O_{xi} < 0, H_{yi} - O_{yi} < 0$ and $H_{xi} - O_{xi} > 0, H_{yi} - O_{yi} > 0$, obtaining a real azimuth angle range represented by Equation 17:

$$\arctan\left(\frac{1-\gamma}{1+\gamma}\beta_i\right) \leq \hat{\theta}_{ci} \leq \arctan\left(\frac{1+\gamma}{1-\gamma}\beta_i\right); \quad \text{[Equation 17]}$$

if $H_{xi}-O_{xi}<0, H_{yi}-O_{yi}>0$ and $H_{xi}-O_{xi}>0, H_{yi}-O_{yi}<0$, obtaining another real azimuth angle ranges represented by Equation 19:

$$\arctan\left(\frac{1+\gamma}{1-\gamma}\beta_i\right) \leq \hat{\theta}_{ci} \leq \arctan\left(\frac{1-\gamma}{1+\gamma}\beta_i\right); \text{ and} \quad \text{[Equation 19]}$$

representing the real azimuth angle ranges of Equations 17 and 29 by using Equation 20:

$$\theta_{CLi} \leq \hat{\theta}_{ci} \leq \theta_{CUi}. \quad \text{[Equation 20]}$$

In the operation (c2-3), if the two real azimuth angle ranges represented by Equation 20 are not overlapped, the geomagnetic fields detected by the compasses may be determined not to be valid, and if not, the geomagnetic fields detected by the compasses may be determined to be valid.

According to another aspect of the present invention, there is provided a method of determining an azimuth angle of an object by using two compasses, comprising: when geomagnetic fields detected by the two compasses are determined to be valid, detecting the azimuth angles by using the two compasses; and determining a final azimuth angle of the compasses by averaging the azimuth angles.

According to another aspect of the present invention, there is provided a method of determining an azimuth angle of an object by using two compasses, comprising: when geomagnetic fields detected by the compasses are determined to be valid, detecting the orientation angle of the object by using a gyro or odometer; and determining a final azimuth angle of the compasses from a value closest to the orientation angle of the object, wherein the final azimuth angle is determined from the value closest to the orientation angle of the object by: defining the approximate value $\overline{\theta}$ (represented by Equation 21:

$$\overline{\theta} = \theta_c(t_{k-1}) + (\omega_g + \tilde{b}) \cdot \Delta t \quad \text{[Equation 21]}$$

wherein $\theta_c(t_{k-1})$ is an estimated azimuth angle of the compass or an estimated orientation angle of the object at a previous sampling time, $\omega_g$ is an angular velocity detected by a gyro or odometer, $\tilde{b}$ is an estimated bias of the gyro, and $\Delta t$ is a sampling time; and when the two real azimuth angle ranges represented by Equation 20 are overlapped, $$\theta_{CLi} \leq \hat{\theta}_{ci} \leq \theta_{CUi} \; (\theta_{CL1}<\theta_{CL2}, \theta_{CU1}<\theta_{CU2}), \quad \text{[Equation 20]}$$

selecting $\overline{\theta}$ as the final azimuth angle of the compass, if the approximate value $\overline{\theta}$ is within the overlapped range $(\theta_{CL2}, \theta_{CU1})$, $(\theta_{CL2}<\overline{\theta}<\theta_{CU1})$; selecting $\theta_{CL2}$ as the final azimuth angle of the compass, if the approximate value $\overline{\theta}$ is within a range $(\theta_{CL1}, \theta_{CL2})$, $(\theta_{CL1}<\overline{\theta}<\theta_{CL2})$; and selecting $\theta_{CU1}$ as the final azimuth angle of the compass, if the approximate value $\overline{\theta}$ is within a range $(\theta_{CU1}, \theta_{CU2})$, $(\theta_{CU1}<\overline{\theta}<\theta_{CU2})$.

According to another aspect of the present invention, there is provided an apparatus for determining a geomagnetic field by using a compass, comprising: an allowable magnetic field range definition unit defining an allowable magnetic field range used to determine a valid geomagnetic region; a magnetic field calculation unit calculating a magnitude of a magnetic field at a position of a compass-installed moving object; a magnetic field comparison unit comparing the magnitude of the magnetic field to determine where or not the magnetic field is within the allowable magnetic field range; and a geomagnetic region determination unit, if the magnitude of the magnetic field is within the allowable magnetic field range, determining the position of a compass-installed moving object is within the valid geomagnetic region, and if not, determining that there is applied an external magnetic field disturbance at the position of a compass-installed moving object.

The allowable magnetic field range definition unit may comprise: a magnetic field detection unit detecting time trajectory of horizontal and vertical components of the magnetic field in a presumed geomagnetic region while the compass rotates, and calculating amplitudes and offsets of a geomagnetic field by using maximum and minimum values of the horizontal and vertical components of the magnetic field; a candidate position group generation unit, if the time trajectory of magnetic field has an approximately sinusoidal wave form, selecting a current position of the compass as a candidate position used to define the allowable magnetic-field range, and if not, changing the position of the compass to perform the detection of the magnetic field detection unit and the selection of the candidate position determination unit, and generating a candidate position group having a predetermined number of candidate positions; and an allowable magnetic field range obtaining unit obtaining the allowable magnetic-field range by calculating mean and variance values of the amplitudes and offsets of the geomagnetic fields at the candidate positions of the candidate position group; and calculating upper and lower limits of the magnitudes of the geomagnetic fields from the amplitudes and offsets.

The candidate position group generation unit may further comprise a candidate position elimination unit comparing the amplitudes and offsets of the geomagnetic fields at the candidate positions and eliminating candidate positions having more than predetermined amplitudes and offsets from the candidate position group.

The allowable magnetic field range definition unit may define at least two allowable magnetic field ranges for at least two compasses used to determine a valid geomagnetic region; and the geomagnetic region determination unit may, if the magnitude of the magnetic field is within the at least two allowable magnetic field ranges, determine that the position of a compass-installed moving object is within the valid geomagnetic region, and if not, determines that there is applied an external magnetic field disturbance at the position of a compass-installed moving object.

The two compasses may be used, and the geomagnetic region determination unit may comprise: a first determination unit, if the magnitude of the magnetic field is not within one of the two allowable magnetic field ranges, determining that there is applied the external magnetic field disturbance at the position of the moving object; and a first validity determination unit, if the magnitude of the magnetic field is within both of the allowable magnetic field ranges, calculating a difference between magnitudes of magnetic fields detected by the two compasses, and if the difference is more than a predetermined value, determining that the geomagnetic fields of the compasses are not valid, and if not, determining that the geomagnetic fields of the compasses are valid.

The first validity determination unit may comprise: a second determination unit, if the magnitude of the magnetic field is within both of the allowable magnetic field ranges, calculating a difference between magnitudes of magnetic fields detected by the two compasses, and if the difference is more than a predetermined value, determining that the geomagnetic fields of the compasses are not valid; and a second validity determination unit, if the difference is not more than the predetermined value, calculating upper and lower limits of azimuth angles of the two compasses from data of the magnetic field detected by the two compasses, and determining whether or not the azimuth angles of the two compasses are valid by using upper and lower limits of the azimuth angles of the two compasses.

The second validity determination unit may comprise: a third determination unit, if two azimuth angle ranges of the two compasses are not overlapped, determining that the geomagnetic fields detected by the compasses are not valid; and a third validity determination unit, if two azimuth angle ranges of the two compasses are overlapped, determining that the geomagnetic fields detected by the compasses are valid.

The apparatus may further comprise a moving direction estimation unit estimating a moving direction of the moving object by using the azimuth angles detected by the compasses based on the result of the determination of the geomagnetic region determination unit.

According to another aspect of the present invention, there is provided an apparatus for determining an azimuth angle of an object by using two compasses, comprising: an azimuth angle detection unit, when geomagnetic fields detected by the two compasses are determined to be valid, detecting the azimuth angles by using the two compasses; and an azimuth angle determination unit determining a final azimuth angle of the compasses by averaging the azimuth angles. According to another aspect of the present invention, there is provided an apparatus for determining an azimuth angle of an object by using two compasses, comprising: an orientation angle detection unit, when geomagnetic fields detected by the two compasses are determined to be valid, detecting the orientation angle of the object by using a gyro or odometer; and an azimuth angle determination unit determining a final azimuth angle of the compasses from a value closest to the orientation angle of the object, wherein the final azimuth angle is determined from the value closest to the orientation angle of the object by: defining the approximate value $\bar{\theta}$ represented by Equation 21:

$$\bar{\theta} = \theta_c(t_{k-1}) + (\omega_g + \tilde{b}) \cdot \Delta t, \quad \text{[Equation 21]}$$

wherein $\theta_c(t_{k-1})$ is an estimated azimuth angle of the compass or an estimated orientation angle of the object at a previous sampling time, $\omega_g$ is an angular velocity detected by a gyro or odometer, $\tilde{b}$ is an estimated bias of the gyro, and $\Delta t$ is a sampling time; and when the two real azimuth angle ranges represented by Equation 20 are overlapped, $$\theta_{CLi} \leq \hat{\theta}_{ci} \leq \theta_{CUi} \ (\theta_{CL1} < \theta_{CL2}, \theta_{CU1} < \theta_{CU2})$$

selecting $\bar{\theta}$ as the final azimuth angle of the compass, if the approximate value $\bar{\theta}$ is within the overlapped range $(\theta_{CL2}, \theta_{CU1})$, $(\theta_{CL2} < \bar{\theta} < \theta_{CU1})$; selecting $\theta_{CL2}$ as the final azimuth angle of the compass, if the approximate value $\bar{\theta}$ is within a range $(\theta_{CL1}, \theta_{CL2})$, $(\theta_{CL1} < \bar{\theta} < \theta_{CL2})$; and selecting $\theta_{CU1}$ as the final azimuth angle of the compass, if the approximate value $\bar{\theta}$ is within a range $(\theta_{CU1}, \theta_{CU2})$, $(\theta_{CU1} < \bar{\theta} < \theta_{CU2})$.

According to another aspect of the present invention, there is provided a computer-readable recording medium storing a program executed by a computer, the program implementing the above-methods.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
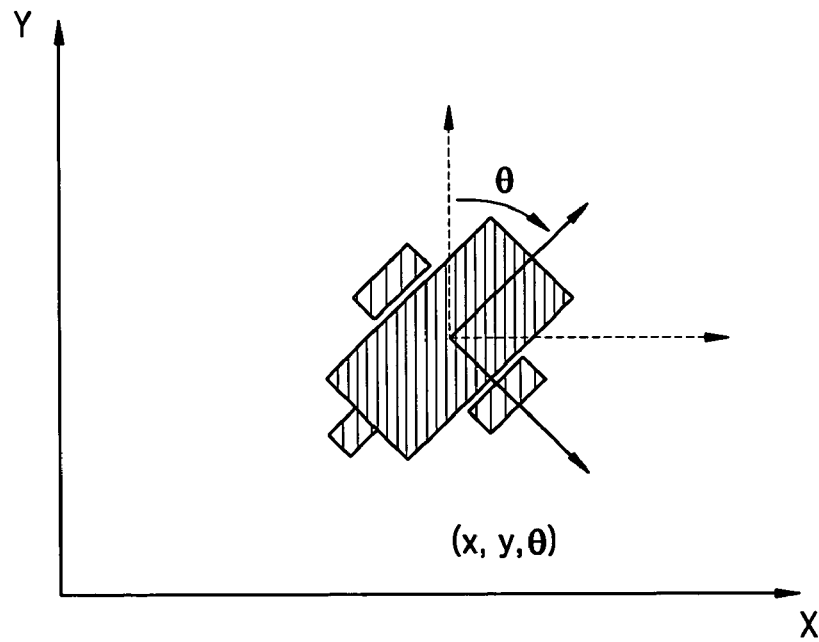
FIG. 1 is a view showing a position (x, y) and an azimuth angle θ of a robot moving on a plane.
Figure 2:
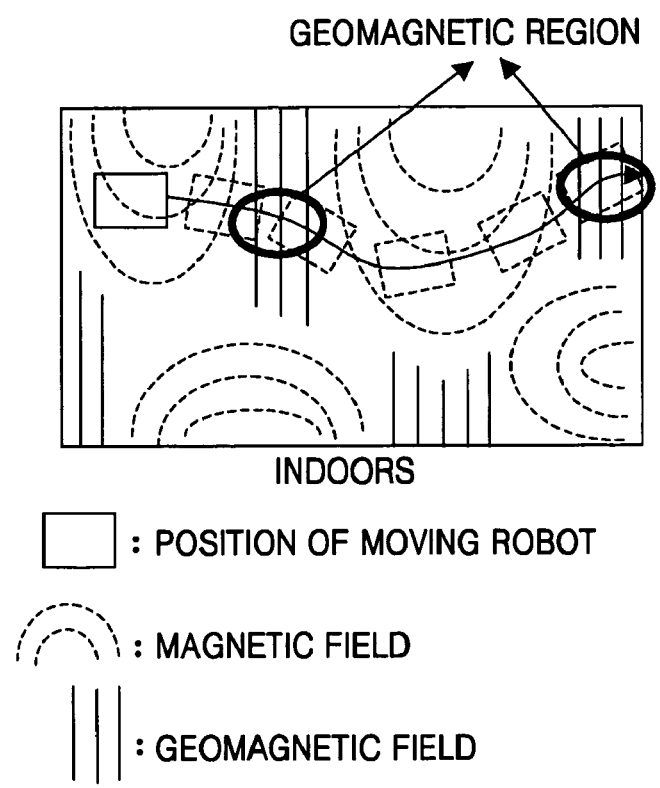
FIG. 2 is a view showing a compass-installed robot moving in an indoor space and geomagnetic fields around the robot.

The present invention and operational advantages thereof can be fully understood by referring to the accompanying drawings and explanations thereof. Exemplary embodiments of the present invention will be described with reference to the accompanying drawings to explain the present invention in detail. In the drawings, the same reference numerals indicate the same elements.

Figure 3:
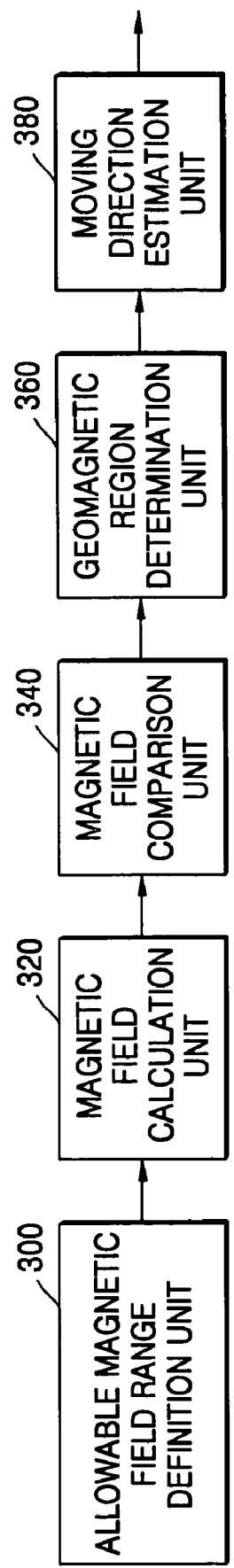
FIG. 3 is a block diagram showing a geomagnetic determination apparatus using a compass according to an embodiment of the present invention.

FIG. 3 is a block diagram showing a geomagnetic determination apparatus using a compass according to an embodiment of the present invention. The geomagnetic determination apparatus comprises an allowable magnetic field range definition unit 300, a magnetic field calculation unit 320, a magnetic field comparison unit 340, a geomagnetic region determination unit 360, and a moving direction estimation unit 380.

The allowable magnetic field range definition unit 300 defines an allowable magnetic field range used to determine a valid geomagnetic region. The allowable magnetic field range definition unit 300 may define the allowable magnetic field ranges for at least two compasses, preferably, two compasses, used to determine a valid geomagnetic region.

The magnetic field calculation unit 320 calculates a magnitude of a magnetic field at a position of a compass-installed moving object. The magnetic field comparison unit 340 compares the magnitude of the magnetic field to determine where or not the magnetic field is within the allowable magnetic field range.

The geomagnetic region determination unit 360 determines the position of a compass-installed moving object is within the valid geomagnetic region, if the magnitude of the magnetic field is within the allowable magnetic field range, and determines that there is applied an external magnetic field disturbance at the position of a compass-installed moving object, if not. Alternatively, in a case where there are installed at least two compasses, the geomagnetic region determination unit 360 determines the position of a compass-installed moving object is within the valid geomagnetic region, if the magnitude of the magnetic field is within the at least two allowable magnetic field ranges, and determines that there is applied an external magnetic field disturbance at the position of a compass-installed moving object, if not.

Figure 10:
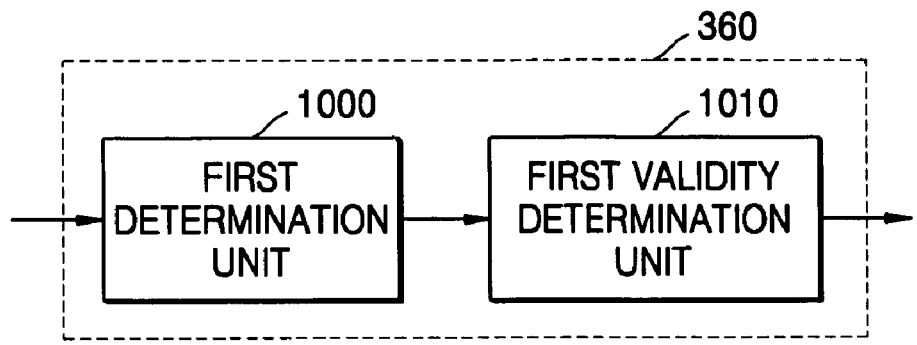
FIG. 10 is a detailed diagram showing a geomagnetic region determination unit in a case where two compasses are used.

FIG. 10 is a detailed diagram showing the geomagnetic region determination unit 360 in a case where two compasses are used. The geomagnetic region determination unit 360 comprises a first determination unit 1000 and a first validity determination unit 1010. The first determination unit 1000 determines that there is applied the external magnetic field disturbance at the position of the moving object, if the magnitude of the magnetic field is not within one of the two allowable magnetic field ranges. If the magnitude of the magnetic field is within both of the allowable magnetic field ranges, the first validity determination unit 1010 calculates a difference between magnitudes of magnetic fields detected by the two compasses. Next, the first validity determination unit 1010 determines that the geomagnetic fields of the compasses are not valid, if the difference is more than a predetermined value, and determines that the geomagnetic fields of the compasses are valid, if not.

Figure 11:
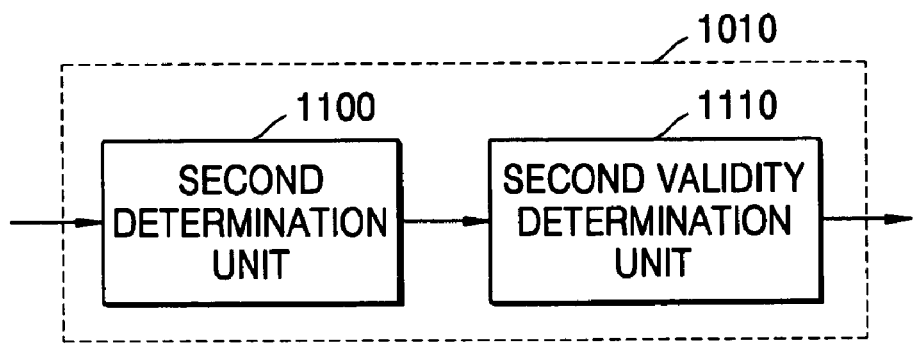
FIG. 11 is a detailed diagram showing a first validity determination unit.

FIG. 11 is a detailed diagram showing the first validity determination unit 1010. The first validity determination unit 1010 comprises a second determination unit 1100 and a second validity determination unit 1110. If the magnitude of the magnetic field is within both of the allowable magnetic field ranges, the second determination unit 1100 calculates a difference between magnitudes of magnetic fields detected by the two compasses. Next, if the difference is more than a predetermined value, the second determination unit 1100 determines that the geomagnetic fields of the compasses are not valid. If the difference is not more than the predetermined value, the second validity determination unit 1110 calculates upper and lower limits of azimuth angles of the two compasses from data of the magnetic field detected by the two compasses, and determines whether or not the azimuth angles of the two compasses are valid by using upper and lower limits of the azimuth angles of the two compasses.

Figure 12:
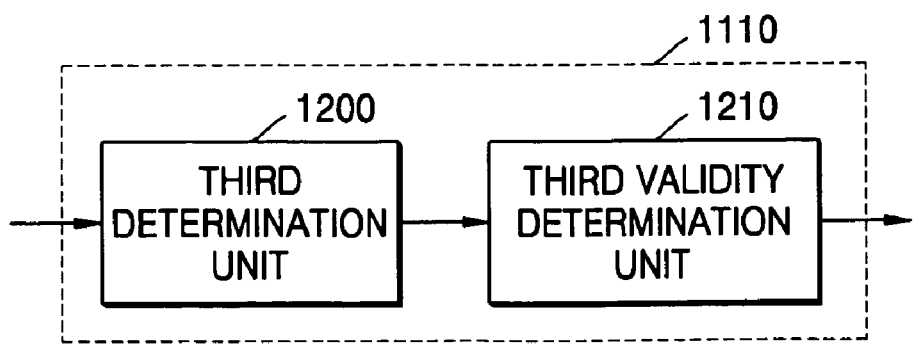
FIG. 12 is a detailed diagram showing a second validity determination unit.

FIG. 12 is a detailed diagram showing the second validity determination unit 1110. The second validity determination unit 1110 comprises a third determination unit 1200 and a third validity determination unit 1210. If two azimuth angle ranges of the two compasses are not overlapped, the third determination unit 1200 determines that the geomagnetic fields detected by the compasses are not valid. If two azimuth angle ranges of the two compasses are overlapped, the third validity determination unit 1210 determines that the geomagnetic fields detected by the compasses are valid.

The moving direction estimation unit 380 estimates a moving direction of the moving object by using the azimuth angles detected by the compasses based on the result of the determination of the geomagnetic region determination unit 360.

Figure 4:
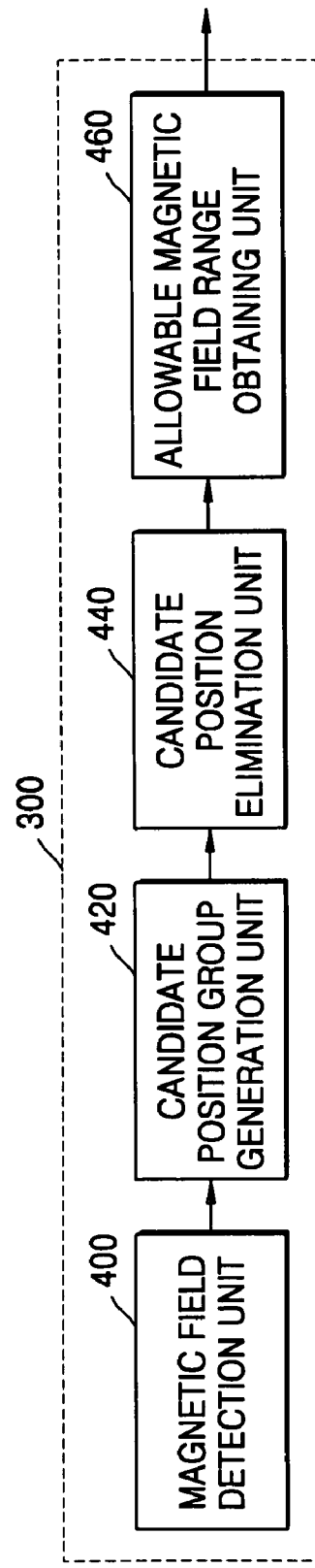
FIG. 4 is a detailed block diagram showing an allowable magnetic field range definition unit.

FIG. 4 is a detailed block diagram showing the allowable magnetic field range definition unit 300. The allowable magnetic field range definition unit 300 comprises a magnetic field detection unit 400, a candidate position group generation unit 420, a candidate position elimination unit 440, and an allowable magnetic field range-obtaining unit 460. The magnetic field detection unit 400 detects time trajectory of horizontal and vertical components Hx and Hy of the magnetic field in a predetermined geomagnetic region while the compass rotates, and calculating amplitudes Ax and Ay and offsets Ox and Oy of a geomagnetic field by using maximum and minimum values of the horizontal and vertical components Hx and Hy of the magnetic field.

If the time trajectory of magnetic field has an approximately sinusoidal wave form, the candidate position group generation unit 420 selects a current position of the compass as a candidate position used to define the allowable magnetic-field range, and if not, changes the position of the compass to perform the detection of the magnetic field detection unit 400 and the selection of the candidate position determination unit 420, and generates a candidate position group Q having a predetermined number of candidate positions.

The candidate position elimination unit 440 compares the amplitudes Hx and Hy and offsets Ox and Oy of the geomagnetic fields at the candidate positions and eliminates candidate positions having more than predetermined amplitudes and offsets from the candidate position group.

The allowable magnetic field range obtaining unit 460 obtains the allowable magnetic-field range by calculating mean and variance values of the amplitudes Hx and Hy and offsets Ox and Oy of the geomagnetic fields at the candidate positions of the candidate position group Q and calculating upper and lower limits of the magnitudes of the geomagnetic fields from the amplitudes Hx and Hy and offsets Ox and Oy.

Figure 5:
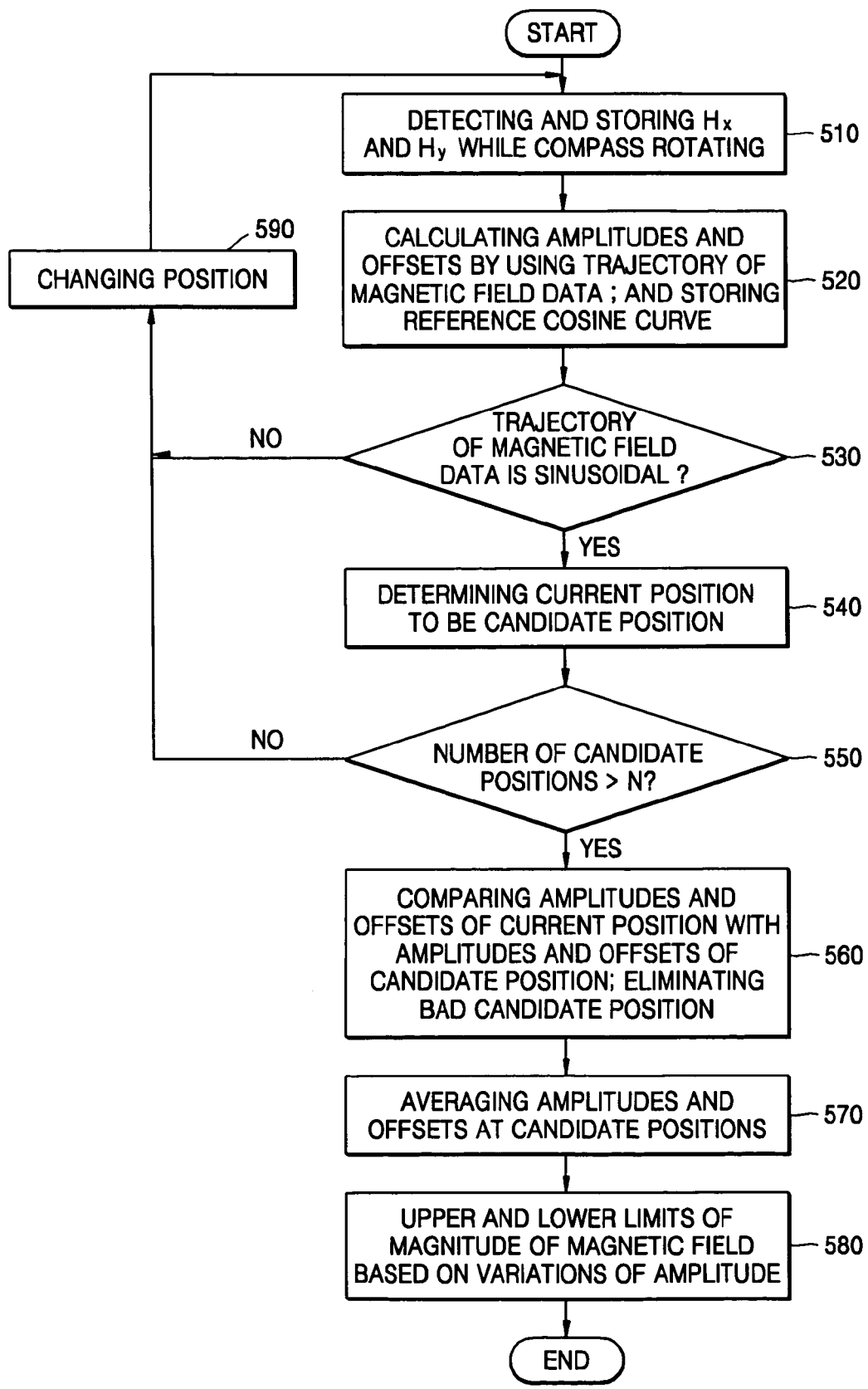
FIG. 5 is a flowchart showing a method of calculating mean values of amplitude and offset, and limits of a magnetic field in a geomagnetic region from variations of time trajectory of an amplitude and an offset of a magnetic field detected by a magnetic sensor while a compass rotates in the geomagnetic region.

FIG. 5 is a flowchart showing a method of calculating mean values of amplitudes and offset, and upper and lower limits of a magnetic field in a geomagnetic region from variations of time trajectory of amplitudes Hx and Hy and an offset of a magnetic field detected by a magnetic sensor while a compass rotates in the geomagnetic region. Now, the allowable magnetic field range definition unit 300 will be described in detail with reference to FIG. 5.

Figure 6:
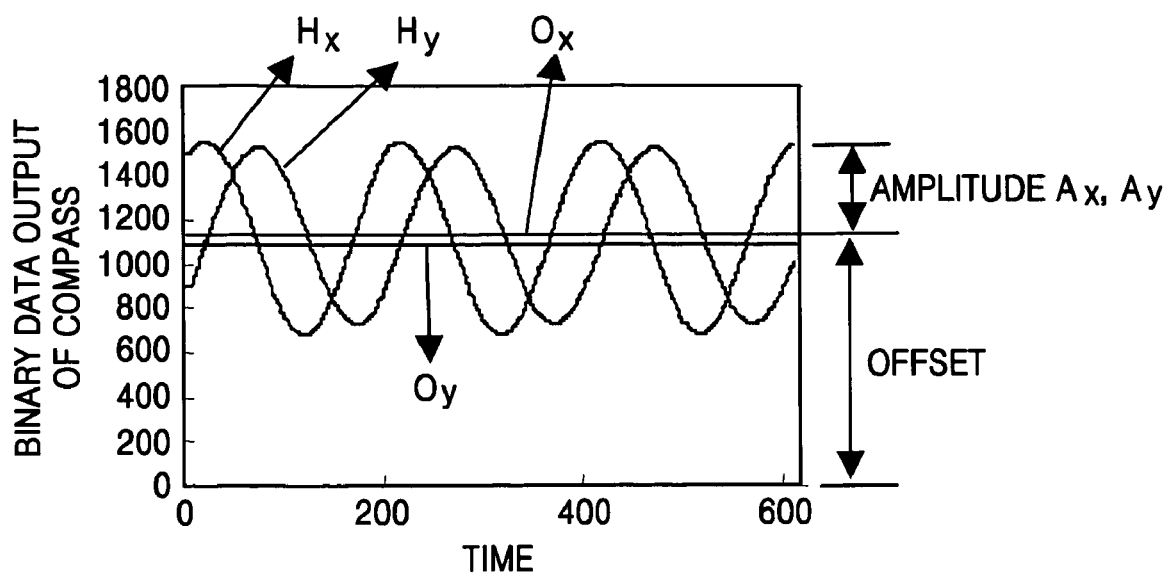
FIG. 6 is a time trajectory of magnetic field detected while a compass rotates.
Figure 7:
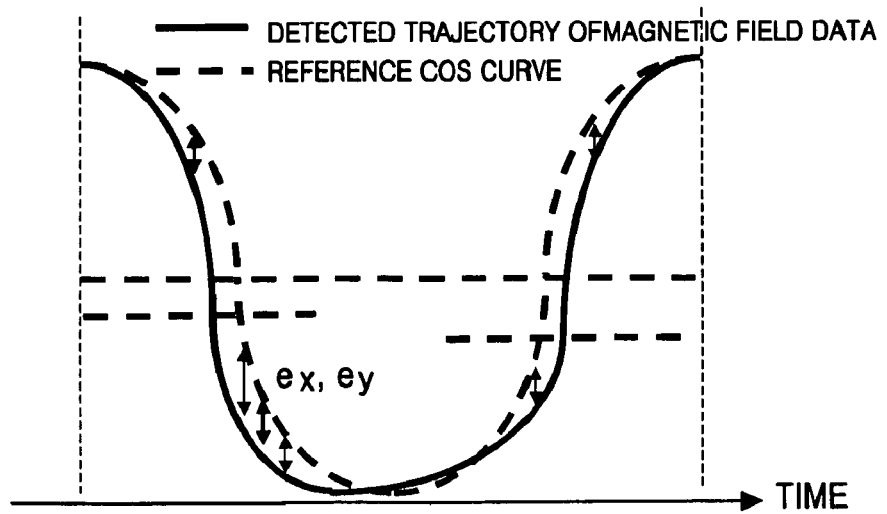
FIG. 7 is a graph showing an error between a reference cosine curve and a magnetic field curve detected while a compass rotates.

The definition process of the allowable magnetic field range is preferably performed in an off-line manner. Magnetic field curve data on horizontal and vertical components Hx and Hy of a magnetic field is detected and stored while a compass or a compass-installed object rotates at specific positions Pi (I=1, 2, . . . ) in an estimated geomagnetic region (operation 510). The magnetic field curve data is computer-readable positive binary data. In general, the magnetic field curve has an approximately sinusoidal waveform having maximum and minimum values Hxmax and Hxmin. The maximum and minimum values Hxmax and Hxmin of the horizontal and vertical components Hx and Hy are depicted in a graph of FIG. 6. Next, amplitudes Ax and Ay and offsets Ox and Oy of a geomagnetic field are calculated by using the maximum and minimum values Hxmax and Hxmin of the horizontal and vertical components Hx and Hy of the magnetic field and a reference cosine curve shown in FIG. 7 (operation 520). The reference cosine curve is obtained by using Equations 1 and 2.

$$H_x = O_x + \left(\frac{H_{xmax} - H_{xmin}}{2}\right)\cos\theta + e_x \qquad \text{[Equation 1]}$$
$$= O_x + A_x \cos\theta + e_x$$

$$H_y = O_y + \left(\frac{A_{ymax} - A_{ymin}}{2}\right)\sin\theta + e_y \qquad \text{[Equation 2]}$$
$$= O_y + A_y \sin\theta + e_y$$

Here, $e_x$ and $e_y$ are errors between the reference cosine curve and the trajectory of detected magnetic field data. In general, since there are an external magnetic field disturbance and a measurement error, the detected magnetic field curve has a distorted cosine waveform.

Next, mean and variance values of the errors $e_x$ and $e_y$ are calculated. If the mean and variance values are not more than predetermined values, a following operation 540 is performed. If the mean and variance values are more than the predetermined values, it is determined that the current position Pi of the compass or the compass-installed object is not with the geomagnetic region, and a following operation 590 is performed (operation 530). In the operation 590, the position of the compass or the compass-installed object changes into another position $P_{i+1}$, and the aforementioned operations 510, 520 and 530 are repeated.

Next, the determination process of the candidate position of the geomagnetic region will be described. A preferable example of this process is disclosed at the Korean Patent Laid-open Application No. P2003-0090938, entitled "Method and Apparatus for Using Magnetic Field", herein incorporated by reference. Preferably, the predetermined values are defined with an experiment.

The current position Pi is selected as an element of the candidate position group Q (operation 540). If the number of the elements of the candidate position group Q is not more than a predetermined value N, the operation 590 is performed. If the number of the elements of the candidate position group Q is more than a predetermined value N, the determination process of the candidate positions ends, and a following operation 560 is performed (operation 550).

Figure 8:
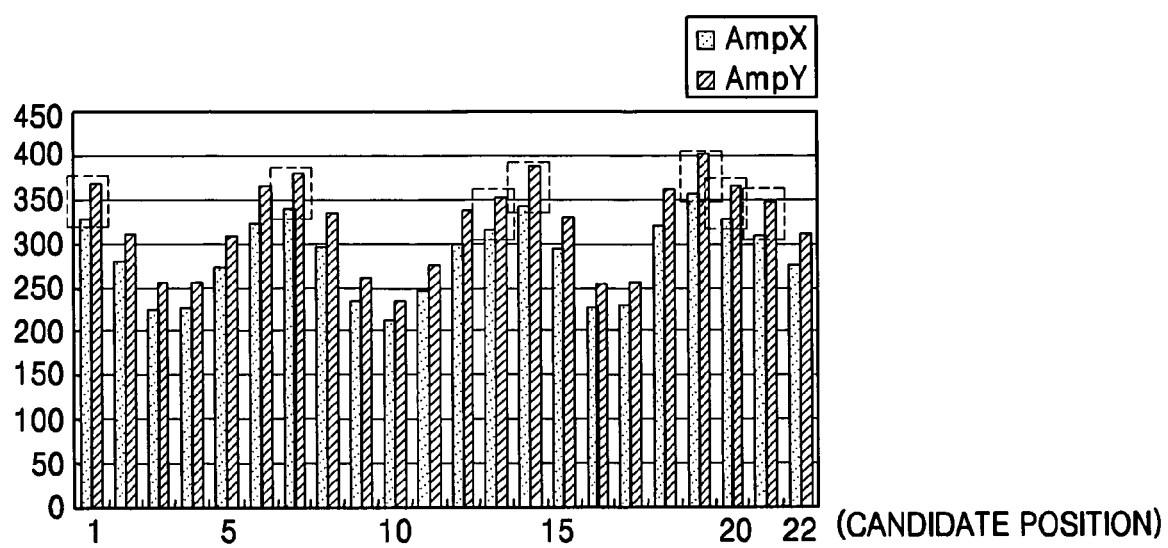
FIG. 8 is a graph showing amplitudes of geomagnetic fields at candidate positions of a candidate position group.
Figure 9:
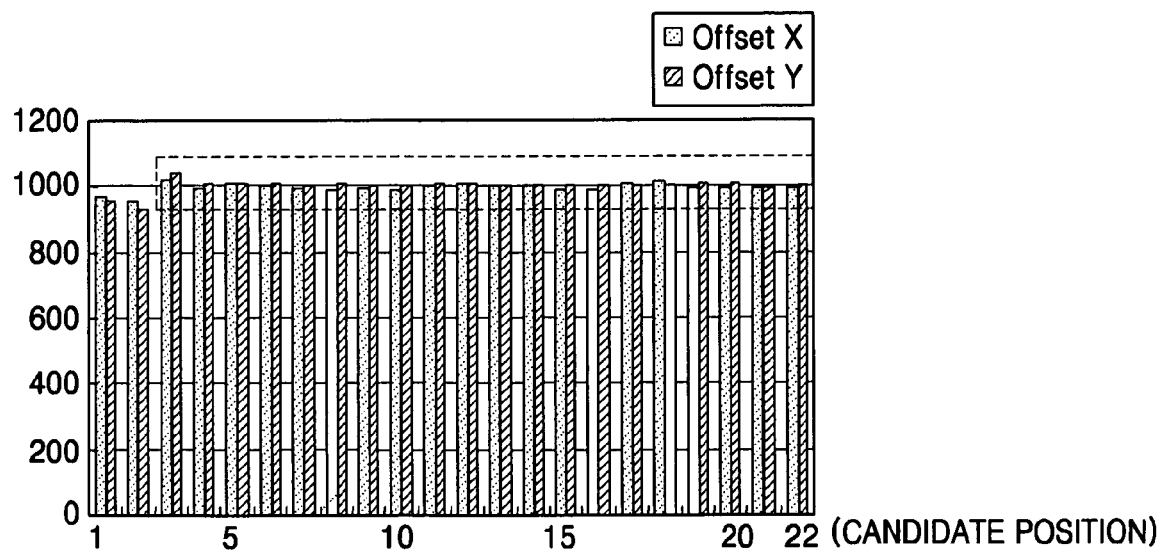
FIG. 9 is a graph showing offsets of geomagnetic fields at candidate positions of a candidate position group.

Next, the amplitudes Ax and Ay and offsets Ox and Oy of the geomagnetic fields at the candidate positions Pi (i=1, . . . , N), and candidate positions having more than predetermined amplitudes and offsets from the candidate position group Q (operation 560). The elimination process of the candidate positions will be described in detail with reference to FIGS. 8 and 9. FIGS. 8 and 9 are graphs showing the amplitudes Ax and Ay and the offsets Ox and Oy of geomagnetic fields at candidate positions of a candidate position group, respectively.

As shown in FIG. 8, the candidate positions Q1, Q7, Q13, Q14, Q19, Q20, and Q21 having more than the predetermined amplitudes are remained as the element of the candidate position group Q, and other candidate positions are eliminated from the candidate position group Q.

In addition, as shown in FIG. 9, the candidate positions Q1 and Q2 having more than the predetermined offsets are remained as the element of the candidate position group Q, and other candidate positions are eliminated from the candidate position group Q. The predetermined amplitudes and offsets used as a reference for the elimination of the candidate positions are obtained by an experiment.

Next, the mean and variance values of the amplitudes Ax and Ay and the offset Ox and Oy of the geomagnetic fields at the candidate positions of the candidate position group Q are calculated (operation 570).

The upper and lower limits of the magnitude |H| of the geomagnetic field are obtained by using the variance values of the amplitudes Ax and Ay as follows. Firstly, the magnitude |H| of the geomagnetic field is calculated from the horizontal and vertical components Hx and Hy of the magnetic field detected by the compass and the mean and variance values of the amplitudes Ax and Ay and the offsets Ox and Oy calculated in the operation 570 by using Equation 3.

$$|H|^2 = \left(\frac{H_x - O_x}{A_x} \times |H_E|\right)^2 + \left(\frac{H_y - O_y}{A_y} \times |H_E|\right)^2 \qquad \text{[Equation 3]}$$

Here, $|H_E|$ is a magnitude of the geomagnetic field, which depends on the location of the compass or the compass-installed object. In Korea, the magnitude of the geomagnetic field is about 0.3 gauss. However, the detailed magnitude depends on an external magnetic field disturbance due to magnetic materials near the compass or the compass-installed object or a measurement error. In addition, there are errors $\Delta Ax$ and $\Delta Ay$ between the amplitudes Ax and Ay in Equation 3 and real amplitudes $\hat{A}x$ and $\hat{A}y$ in a real geomagnetic region. The magnitude |H| is represented with errors $\Delta Ax$ and $\Delta Ay$ by using Equation 4

$$|H|^2 = \left(\frac{H_x - O_x}{\hat{A}_x + \Delta A_x} \times |H_E|\right)^2 + \left(\frac{H_y - O_y}{\hat{A}_y + \Delta A_y} \times |H_E|\right)^2 \qquad \text{[Equation 4]}$$

Here, it is assumed that the errors $\Delta Ax$ and $\Delta Ay$ have ranges represented by Equations 5 and 6, respectively.

$$-\gamma \hat{A}_x \leq \Delta A_x \leq \gamma \hat{A}_x \qquad \text{[Equation 5]}$$

$$-\gamma \hat{A}_y \leq \Delta A_y \leq \gamma \hat{A}_y \qquad \text{[Equation 6]}$$

Here, $\gamma$ is a constant associated with allowable limits of the real amplitudes $\hat{A}x$ and $\hat{A}y$ and has a value of 0 to 1. The allowable magnetic-field range represented by Equation 7 is obtained by using Equations 4, 5, and 6.

$$\frac{1}{(1+\gamma)^2}\left(\left(\frac{H_x - O_x}{\hat{A}_x} \times |H_E|\right)^2 + \left(\frac{H_y - O_y}{\hat{A}_y} \times |H_E|\right)^2\right) \leq |H|^2 \leq \qquad \text{[Equation 7]}$$
$$\frac{1}{(1-\gamma)^2}\left(\left(\frac{H_x - O_x}{\hat{A}_x} \times |H_E|\right)^2 + \left(\frac{H_y - O_y}{\hat{A}_y} \times |H_E|\right)^2\right)$$

The allowable magnetic-field range represented by Equation 7 is simplified into Equation 8. The allowable magnetic field range shows the upper and lower limits of estimated geomagnetic field in a region associated with the candidate position group Q.

$$\frac{1}{1+\gamma}|H_E| \le |H| \le \frac{1}{1-\gamma}|H_E|. \quad \text{[Equation 8]}$$

Since the errors between the offsets at the candidate positions of the candidate position group Q are not large, the above description is made based on the errors between the amplitudes at the candidate positions. However, the description can be generalized to the errors between the offsets.

Instead of the method according to the flowchart of FIG. 5, the data on the geomagnetic field may be input to a compass or a compass-installed object just before the product is delivered from a factory. However, since accurate results may not be obtained with the compass or the compass-installed object such as a compass-installed robot, the method according to the flowchart of FIG. 5 can show more accurate results.

Figure 13:
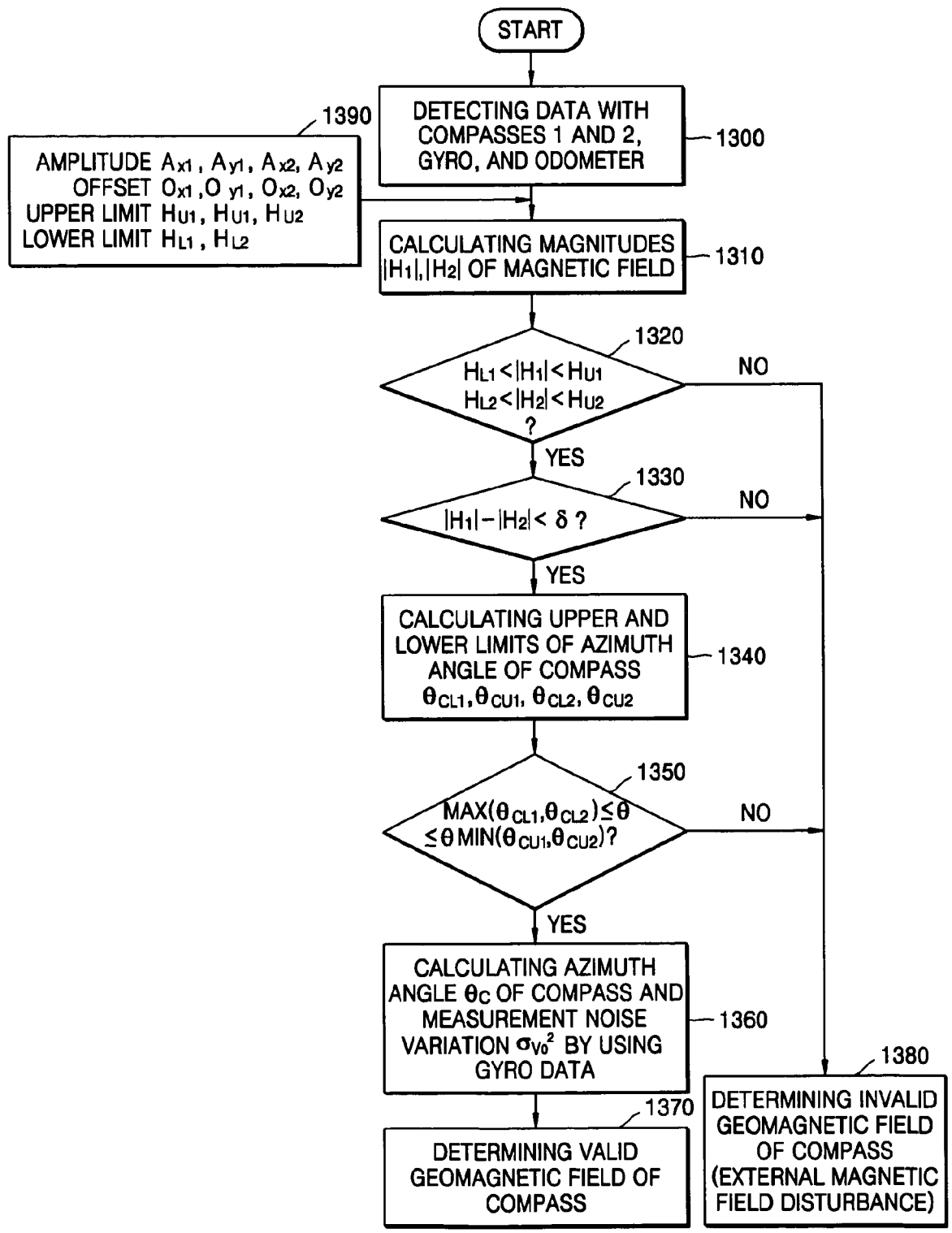
FIG. 13 is a flowchart showing a method of determining a validity of an azimuth angle indicated by a compass of a compass-installed object such as a compass-installed robot moving in a working region by using an amplitude, an offset and upper and lower limits of a magnetic field obtained in an offline stage.
Figure 14:
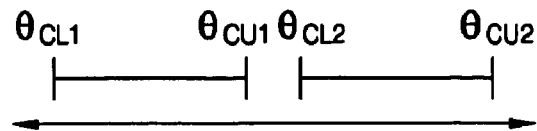
FIG. 14 is a view showing allowable azimuth angle ranges indicated by two compasses in an distorted magnetic field.
Figure 15:
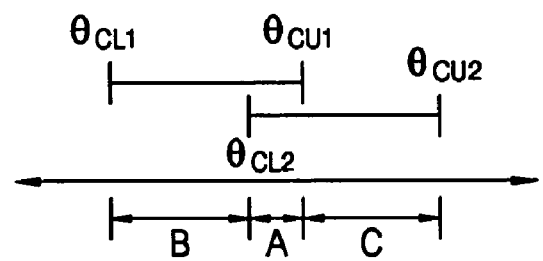
FIG. 15 is a view showing allowable azimuth angle ranges indicated by two compasses in a geomagnetic field.

FIG. 13 is a flowchart showing a method of determining a validity of an azimuth angle indicated by a compass of a compass-installed object such as a compass-installed robot moving in a working region by using an amplitude, an offset and upper and lower limits of a magnetic field obtained in an offline stage. First, data on the magnetic field is detected by two compasses, a gyro, and an odometer (operation 1300). A magnitude of the magnetic field is calculated from the data on the magnetic field detected by the two compasses by using Equation 3 (operation 1310). It is determined whether the magnitude of the magnetic field calculated in the operation 1310 is within the allowable magnetic-field range obtained by Equation 8. If the magnitude of the magnetic field is within the allowable magnetic-field range, a following operation 1330 is performed, and if not, it is determined that the geomagnetic fields at the current position of the compass is not valid (operation 1320).

A difference between magnitudes of magnetic fields detected by the two compasses are calculated, and if the difference is more than a predetermined value, it is determined that the geomagnetic fields of the compasses are not valid, and if not, a following operation 1340 is performed (operation 1330).

$$\theta_{ci} = \arctan\left(\frac{\frac{H_{xi}-O_{xi}}{A_{xi}}}{\frac{H_{yi}-O_{yi}}{A_{yi}}}\right) = \arctan\left(\frac{A_{yi}(H_{xi}-O_{xi})}{A_{xi}(H_{yi}-O_{yi})}\right), \quad \text{[Equation 9]}$$

Here, i indicates the two compasses and is 1 and 2. If a compass-installed object or robot is located in a geomagnetic region, the upper and lower limits of the amplitudes Ax and Ay in the geomagnetic region are obtained as following Equations 10 and 11.

$$(1-\gamma)\hat{A}_{xi} \le A_{xi} \le (1+\gamma)\hat{A}_{xi} \quad \text{[Equation 10]}$$

$$(1-\gamma)\hat{A}_{yi} \le A_{yi} \le (1+\gamma)\hat{A}_{yi} \quad \text{[Equation 11]}$$

From Equations 10 and 11, the upper and lower limits of the ratio of the amplitudes Ax and Ay are obtained as following Equation 12.

$$\frac{1-\gamma}{1+\gamma}\frac{\hat{A}_{yi}}{\hat{A}_{xi}} \le \frac{A_{yi}}{A_{xi}} \le \frac{1+\gamma}{1-\gamma}\frac{\hat{A}_{yi}}{\hat{A}_{xi}} \quad \text{[Equation 12]}$$

The upper and lower limits of ratios of real amplitudes $\hat{A}x$ and $\hat{A}y$ in the real geomagnetic region are obtained from Equation 12. The result is represented by Equation 13:

$$\frac{1-\gamma}{1+\gamma}\frac{A_{yi}}{A_{xi}} \le \frac{\hat{A}_{yi}}{\hat{A}_{xi}} \le \frac{1+\gamma}{1-\gamma}\frac{A_{yi}}{A_{xi}}. \quad \text{[Equation 13]}$$

Next, constants $\beta_i$ and $\hat{\beta}_i$ are defined by Equation 14:

$$\beta_i \equiv \frac{A_{yi}(H_{xi}-O_{xi})}{A_{xi}(H_{yi}-O_{yi})}, \qquad \hat{\beta}_i \equiv \frac{\hat{A}_{yi}(H_{xi}-O_{xi})}{\hat{A}_{xi}(H_{yi}-O_{yi})}. \quad \text{[Equation 14]}$$

Since the azimuth angle of the compass is obtained form the real amplitudes and offsets of the magnetic field in a geomagnetic region, the real azimuth angle $\overline{\theta}_{ci}$ of the compass needs to be represented with the constant $\hat{\beta}_i$ as follows.

$$\hat{\theta}_{ci} = \arctan \hat{\beta}_i \quad \text{[Equation 15]}$$

However, the real amplitudes and offsets of the magnetic field are not accurately known. Therefore, the real amplitudes and offsets can be represented with allowable ranges as follows.

If $H_{xi}-O_{xi}<0, H_{yi}-O_{yi}<0$ and $H_{xi}-O_{xi}>0, H_{yi}-O_{yi}>0$, Equation 16 is satisfied.

$$\frac{1-\gamma}{1+\gamma}\beta_i \le \hat{\beta}_i \le \frac{1+\gamma}{1-\gamma}\beta_i \quad \text{[Equation 16]}$$

From Equation 16, the real azimuth angle ranges are obtained as follows.

$$\arctan\left(\frac{1-\gamma}{1+\gamma}\beta_i\right) \le \hat{\theta}_{ci} \le \arctan\left(\frac{1+\gamma}{1-\gamma}\beta_i\right) \quad \text{[Equation 17]}$$

If $H_{xi}-O_{xi}<0, H_{yi}-O_{yi}>0$ and $H_{xi}-O_{xi}>0, H_{yi}-O_{yi}<0$, Equation 18 is satisfied.

$$\frac{1+\gamma}{1-\gamma}\beta_i \le \hat{\beta}_i \le \frac{1-\gamma}{1+\gamma}\beta_i \quad \text{[Equation 18]}$$

From Equation 18, the real azimuth angle ranges are obtained as follows.

$$\arctan\left(\frac{1+\gamma}{1-\gamma}\beta_i\right) \le \hat{\theta}_{ci} \le \arctan\left(\frac{1-\gamma}{1+\gamma}\beta_i\right) \quad \text{[Equation 19]}$$

Equations 17 and 19 can be simplified with Equation 20.

$$\theta_{CLi} \le \hat{\theta}_{ci} \le \theta_{CUi} \quad \text{[Equation 20]}$$

It is determined whether or not the azimuth angel of the compasses is valid by using the two real azimuth angle ranges (operation 1350). As shown in FIG. 4, if the two real azimuth angle ranges represented by Equation 20 are not overlapped, the probability of the compasses being within a geomagnetic region, so that the geomagnetic fields detected by the compasses are determined not to be valid. As shown in FIG. 5, if the two real azimuth angle ranges are overlapped, a following operation 1360 is performed to obtain a final azimuth angle of the compass.

Figure 16:
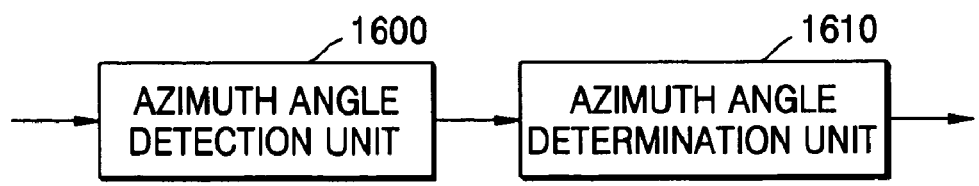
FIG. 16 is a block diagram showing an azimuth angle determination apparatus using a method of determining a geomagnetic field by using two compasses according to an embodiment of the present invention.

FIG. 16 is a block diagram showing an azimuth angle determination apparatus using a method of determining a geomagnetic field by using two compasses according to the aforementioned embodiment of the present invention.

The azimuth angle determination apparatus comprises an azimuth angle detection unit 1600 and an azimuth angle determination unit 1610. When the geomagnetic fields detected by the two compasses are determined to be valid, the azimuth angles of the two compasses are obtained. The azimuth angle determination unit 1610 determines a final azimuth angle of the compasses by averaging the azimuth angles.

Figure 17:
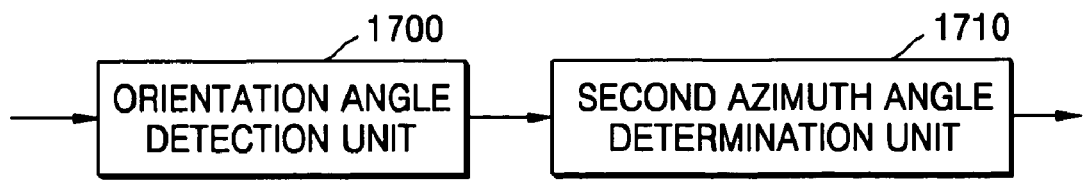
FIG. 17 is a block diagram showing an azimuth angle determination apparatus using a method of determining a geomagnetic field by using two compasses according to another embodiment of the present invention.

FIG. 17 is a block diagram showing an azimuth angle determination apparatus using a method of determining a geomagnetic field by using two compasses according to another embodiment of the present invention. The azimuth angle determination apparatus comprises an orientation angle detection unit 1700 and azimuth angel determination unit 1710. If geomagnetic fields detected by the two compasses are determined to be valid, the orientation angle detection unit 1700 detects the orientation angle of the object by using a gyro or odometer. The azimuth angle determination unit 1710 determinates a final azimuth angle of the compass from a value closest to the orientation angle of the object.

As shown in FIGS. 16 and 17, the final azimuth angle of the compasses may be determined by averaging the azimuth angles of the compasses or by using the value closest to the orientation angle of the objected detected by the gyro or odometer (operation 1360). The average includes an arithmetical average, a geometric average, a harmonic average, and an average using a probability distribution.

More specifically, the final azimuth angle is determined from the value closest to the orientation angle of the object as follows. Firstly, an approximate value $\bar{\theta}$ represented by Equation 21 is defined.

$$\bar{\theta} = \theta_c(t_{k-1}) + (\omega_g + \bar{b}) \cdot \Delta t \qquad \text{[Equation 21]}$$

Here, wherein $\theta_c(t_{k-1})$ is an estimated azimuth angle of the compass or an estimated orientation angle of the object at a previous sampling time, $\omega_g$ is an angular velocity detected by a gyro or odometer, $\bar{b}$ is an estimated bias of the gyro, and $\Delta t$ is a sampling time.

Next, the final azimuth angle is determined by: selecting $\bar{\theta}$ as the final azimuth angle of the compass, if the approximate value $\bar{\theta}$ is within the overlapped range A ($\theta_{CL2}$, $\theta_{CU1}$), ($\theta_{CL2} < \bar{\theta} < \theta_{CU1}$); selecting $\theta_{CL2}$ as the final azimuth angle of the compass, if the approximate value $\bar{\theta}$ is within a range B ($\theta_{CL1}$, $\theta_{CL2}$), ($\theta_{CL1} < \bar{\theta} < \theta_{CL2}$); and selecting $\theta_{CU1}$ as the final azimuth angle of the compass, if the approximate value $\bar{\theta}$ is within a range C ($\theta_{CU1}$, $\theta_{CU2}$), ($\theta_{CU1} < \bar{\theta} < \theta_{CU2}$).

Figure 18:
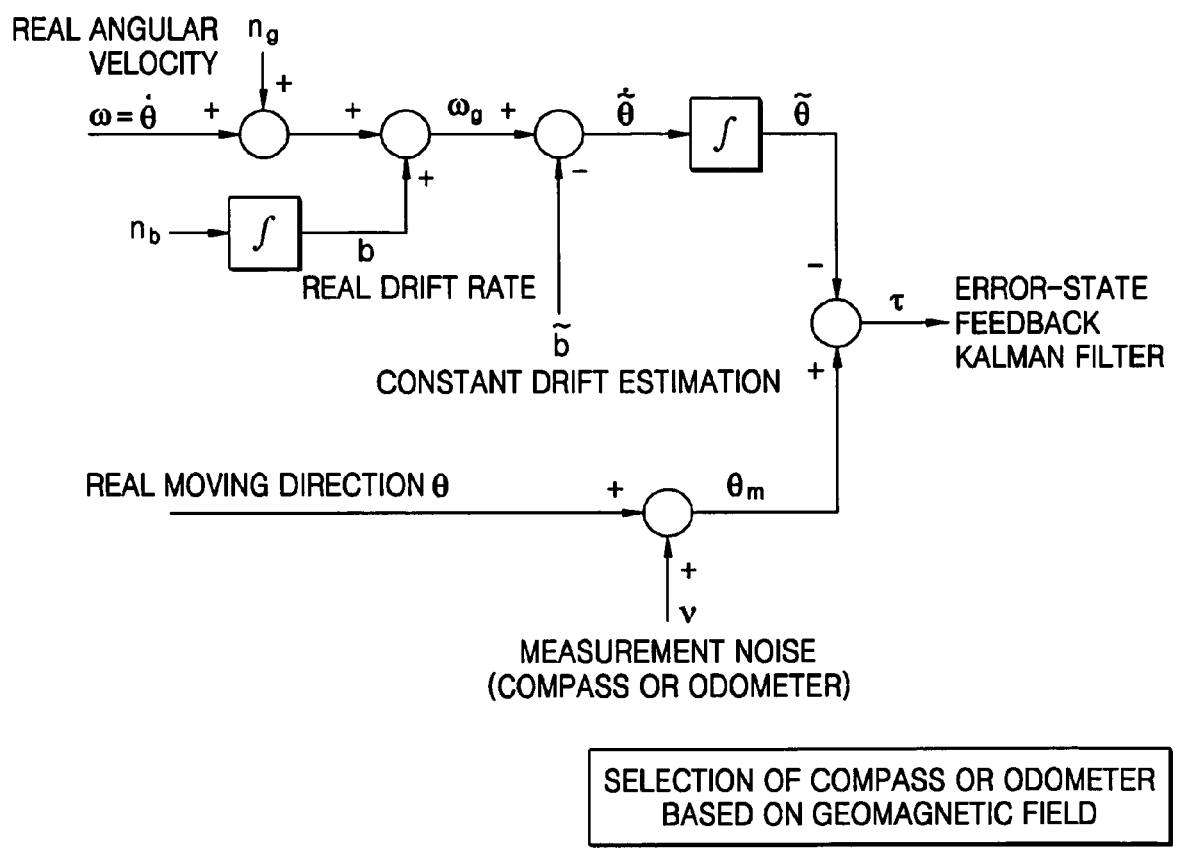
FIG. 18 is a view showing a Kalman filter using a compass, a gyro, and an odometer.

As described above, when the azimuth angle of the compass is determined to be valid, the optimal moving direction of the object can be estimated by selecting the final azimuth angle of the compass as an input of a Kalman filter shown in FIG. 18. On the other hand, when the azimuth angle of the compass is determined not to be valid, the optimal moving direction can be estimated by: selecting the azimuth angle obtained from the orientation angle detected by the odometer as an input of the Kalman filter, if a difference between the angular velocities of the gyro and the odometer is not more than a predetermined value; or selecting the azimuth angle obtained from the orientation angle detected by the gyro as an input of the Kalman filter, if a difference between the angular velocities of the gyro and the odometer is more than a predetermined value.

According to the present invention, since an error of an azimuth angle of the compass due to an external magnetic field disturbance can be determined, it is possible to accurately detect a valid azimuth angle of the compass.

In addition, since an allowable magnetic field range is determined based on a variation of magnetic field detected by a compass rather than a conventional method that simply compares a magnetic field and a geomagnetic field, it is possible to accurately determine the geomagnetic field.

In addition, since a valid geomagnetic field is determined in a case where allowable magnetic field ranges of several compasses are overlapped rather than a conventional method that may confuse an external magnetic field disturbance with a geomagnetic field, it is possible to accurately determine the geomagnetic field.

In addition, since the accurately detected azimuth angle of a compass is used together with angular velocities of a gyro and an odometer in sensor fusion of the compass, the gyro and the odometer, it is possible to accurately a geomagnetic field even in a case where there is an external magnetic disturbance.

In addition, a method and apparatus for determining a geomagnetic field according to the present invention can be adapted to control a compass-installed robot or a compass-installed vehicle.

In addition, it is possible to improve performance of a Kalman filter by using a rule of determining a validity of a compass according to the present invention.

In addition, since "Yaw" angle and robust data on a 3D angle can be effectively obtained, it is possible to adapt the present invention to various applications for absolute position determination and pose estimation. Examples of the applications include an autonomous intelligent vehicle, a car navigation system, a medical robot, a virtual reality (VR) system, an entertainment, an Unmanned Vehicle System (UVS), and a personal navigation system (PSN).

The invention can also be embodied as computer readable codes on a computer readable recording medium. The computer readable recording medium is any data storage device that can store data that can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of determining a geomagnetic field by using a compass, comprising:
   defining an allowable magnetic field range used to determine a valid geomagnetic region;
   calculating a magnitude of a magnetic field in a geomagnetic-field validity test region by using a compass; and
   if the magnitude of the magnetic field is within the allowable magnetic field range, determining that the geomagnetic-field validity test region is the valid geomagnetic region, and if not, determining that there is applied an external magnetic field disturbance.

2. The method according to claim 1, wherein the defining of the allowable magnetic field range comprises:
   (a1) detecting time trajectory of horizontal and vertical components of the magnetic field in a predetermined geomagnetic region while the compass rotates;
   (a2) calculating amplitudes (Ax, Ay) and offsets (Ox, Oy) of a geomagnetic field by using maximum and minimum values of time trajectory of the horizontal and vertical components in the magnetic field;
   (a3) if the magnetic field curve has an approximately sinusoidal wave form, selecting a current position of the compass as a candidate position used to define the allowable magnetic-field range, and if not, changing the position of the compass to perform the operations (a1) to (a3);
   (a4) generating a candidate position group having a predetermined number of candidate positions by repeating the operations (a1) to (a3);
   (a5) calculating mean and variance values of the amplitudes and offsets of the geomagnetic fields at the candidate positions of the candidate position group; and
   (a6) obtaining the allowable magnetic-field range by calculating upper and lower limits of the magnitudes of the geomagnetic fields from the amplitudes and offsets.

3. The method according to claim 2, wherein the operation (a4) further comprises comparing the amplitudes and offsets of the geomagnetic fields among the candidate positions and eliminating candidate positions having more than predetermined amplitudes and offsets from the candidate position group.

4. The method according to claim 3, wherein the upper and lower limits of the geomagnetic fields of the operation (a6) are obtained by calculating the magnitude |H| of the magnetic field from the horizontal and vertical components Hx and Hy of the magnetic field, the amplitudes Ax and Ay, and the offsets Ox and Oy by using Equation 3:

$$|H|^2 = \left(\frac{H_x - O_x}{A_x} \times |H_E|\right)^2 + \left(\frac{H_y - O_y}{A_y} \times |H_E|\right)^2, \quad \text{[Equation 3]}$$

wherein $|H_E|$ is a magnitude of the geomagnetic field;
representing the magnitude |H| with errors $\Delta Ax$ and $\Delta Ay$ between the amplitudes Ax and Ay and real amplitudes $\hat{A}x$ and $\hat{A}y$ in a real magnetic region by using Equation 4:

$$|H|^2 = \left(\frac{H_x - O_x}{\hat{A}_x + \Delta A_x} \times |H_E|\right)^2 + \left(\frac{H_y - O_y}{\hat{A}_y + \Delta A_y} \times |H_E|\right)^2 \quad \text{[Equation 4]}$$

wherein the errors $\Delta Ax$ and $\Delta Ay$ have ranges represented by Equations 5 and 6, respectively:

$$-\gamma \hat{A}_x \leq \Delta A_x \leq \gamma \hat{A}_x \quad \text{[Equation 5]}$$

$$-\gamma \hat{A}_y \leq \Delta A_y \leq \gamma \hat{A}_y \quad \text{[Equation 6]}$$

wherein $\gamma$ is a constant associated with allowable limits of the real amplitudes $\hat{A}x$ and $\hat{A}y$ and has a value of 0 to 1;
obtaining the allowable magnetic-field range represented by Equation 7 by using Equations 4, 5, and 6;

$$\frac{1}{(1+\gamma)^2}\left(\left(\frac{H_x - O_x}{\hat{A}_x} \times |H_E|\right)^2 + \left(\frac{H_y - O_y}{\hat{A}_y} \times |H_E|\right)^2\right) \leq |H|^2 \leq \quad \text{[Equation 7]}$$

$$\frac{1}{(1-\gamma)^2}\left(\left(\frac{H_x - O_x}{\hat{A}_x} \times |H_E|\right)^2 + \left(\frac{H_y - O_y}{\hat{A}_y} \times |H_E|\right)^2\right)$$

obtaining the allowable magnetic-field range represented by Equation 8 from Equation 7, $$\frac{1}{1+\gamma}|H_E| \leq |H| \leq \frac{1}{1-\gamma}|H_E|. \quad \text{[Equation 8]}$$

5. The method according to claim 1, wherein the defining of the allowable magnetic-field range is performed at a time of manufacturing the compass.

6. A computer-readable recording medium storing a program executed by a computer, the program implementing a method according to claim 1.

7. A method of determining a geomagnetic field by using at least two compasses, comprising:
   (a) defining at least two allowable magnetic field ranges used to determine a valid geomagnetic region for the at least two compasses;
   (b) calculating a magnitude of a magnetic field in a geomagnetic-field validity test region by using the at least two compasses; and
   (c) if the magnitude of the magnetic field is within the at least two allowable magnetic field ranges, determining that the geomagnetic-field validity test region is the valid geomagnetic region, and if not, determining that there is applied an external magnetic field disturbance.

8. The method according to claim 7,
   wherein two compasses are used, and
   wherein the operation (c) comprises:
   (c1) if the magnitude of the magnetic field is not within one of the two allowable magnetic field ranges, determining that there is applied the external magnetic field disturbance; and
   (c2) if the magnitude of the magnetic field is within both of the allowable magnetic field ranges, calculating a difference between magnitudes of magnetic fields detected by the two compasses, and if the difference is more than a predetermined value, determining that the geomagnetic fields of the compasses are not valid, and if not, determining that the geomagnetic fields of the compasses are valid.

9. The method according to claim 7, wherein the operation (c2) comprises:
   (c2-1) if the magnitude of the magnetic field is within both of the allowable magnetic field ranges, calculating a difference between magnitudes of magnetic fields detected by the two compasses, and if the difference is more than a predetermined value, determining that the geomagnetic fields of the compasses are not valid;

(c2-2) if the difference is not more than the predetermined value, calculating upper and lower limits of azimuth angles of the two compasses from data of the magnetic field detected by the two compasses; and (c2-3) determining whether or not the azimuth angles of the two compasses are valid by using upper and lower limits of the azimuth angles of the two compasses.

10. The method according to claim 9, wherein the upper and lower limits of the two compasses are obtained by:

calculating the azimuth angles of the compasses from the magnetic fields detected by the two compasses by using Equation 8:

$$\theta_{ci} = \arctan\left(\frac{\frac{H_{xi} - O_{xi}}{A_{xi}}}{\frac{H_{yi} - O_{yi}}{A_{yi}}}\right) = \arctan\left(\frac{A_{yi}(H_{xi} - O_{xi})}{A_{xi}(H_{yi} - O_{yi})}\right),$$ [Equation 9]

wherein i indicates the two compasses and is 1 and 2;

if a compass-installed object or robot is located in a valid geomagnetic region, obtaining upper and lower limits of ratios of real amplitudes in the geomagnetic region represented by Equation 13:

$$\frac{1-\gamma}{1+\gamma}\frac{A_{yi}}{A_{xi}} \leq \frac{\hat{A}_{yi}}{\hat{A}_{xi}} \leq \frac{1+\gamma}{1-\gamma}\frac{A_{yi}}{A_{xi}};$$ [Equation 13]

when constants $\beta_i$ and $\hat{\beta}_i$ are defined by Equation 14:

$$\beta_i \equiv \frac{A_{yi}(H_{xi} - O_{xi})}{A_{xi}(H_{yi} - O_{yi})}, \qquad \hat{\beta}_i \equiv \frac{\hat{A}_{yi}(H_{xi} - O_{xi})}{\hat{A}_{xi}(H_{yi} - O_{yi})},$$ [Equation 14]

if $H_{xi} - O_{xi} < 0, H_{yi} - O_{yi} < 0$ and $H_{xi} - O_{xi} > 0, H_{yi} - O_{yi} > 0$, obtaining a real azimuth angle range represented by Equation 17:

$$\arctan\left(\frac{1-\gamma}{1+\gamma}\beta_i\right) \leq \hat{\theta}_{ci} \leq \arctan\left(\frac{1+\gamma}{1-\gamma}\beta_i\right);$$ [Equation 17]

if $H_{xi} - O_{xi} < 0, H_{yi} - O_{yi} > 0$ and $H_{xi} - O_{xi} > 0, H_{yi} - O_{yi} < 0$, obtaining another real azimuth angle ranges represented by Equation 19:

$$\arctan\left(\frac{1+\gamma}{1-\gamma}\beta_i\right) \leq \hat{\theta}_{ci} \leq \arctan\left(\frac{1-\gamma}{1+\gamma}\beta_i\right); \text{ and}$$ [Equation 19]

representing the real azimuth angle ranges of Equations 17 and 29 by using Equation 20:

$$\theta_{CLi} \leq \hat{\theta}_{ci} \leq \theta_{CUi}.$$ [Equation 20]

11. The method according to claim 10, wherein, in the operation (c2-3), if the two real azimuth angle ranges represented by Equation 20 are not overlapped, the geomagnetic fields detected by the compasses are determined not to be valid, and if not, the geomagnetic fields detected by the compasses are determined to be valid.

12. A method of determining an azimuth angle of an object by using two compasses, comprising:

when geomagnetic fields detected by the two compasses are determined to be valid according to claim 11, detecting the azimuth angles by using the two compasses; and determining a final azimuth angle of the compasses by averaging the azimuth angles.

13. A computer-readable recording medium storing a program executed by a computer, the program implementing a method according to claim 12.

14. A method of determining an azimuth angle of an object by using two compasses, comprising:

when geomagnetic fields detected by the compasses are determined to be valid according to claim 11, detecting the orientation angle of the object by using a gyro or odometer; and determining a final azimuth angle of the compasses from a value closest to the orientation angle of the object, wherein the final azimuth angle is determined from the value closest to the orientation angle of the object by:

defining the approximate value $\overline{\theta}$ represented by Equation 21:

$$\overline{\theta} \equiv \theta_c(t_{k-1}) + (\omega_g + \hat{b}) \cdot \Delta t,$$ [Equation 21]

wherein $\theta_c(t_{k-1})$ is an estimated azimuth angle of the compass or an estimated orientation angle of the object at a previous sampling time, $\omega_g$ is an angular velocity detected by a gyro or odometer, $\hat{b}$ is an estimated bias of the gyro, and $\Delta t$ is a sampling time; and when the two real azimuth angle ranges represented by Equation 20 are overlapped, $$\theta_{CLi} \leq \hat{\theta}_{ci} \leq \theta_{CUi} \ (\theta_{CL1} < \theta_{CL2}, \theta_{CU1} < \theta_{CU2}),$$ [Equation 20]

selecting $\overline{\theta}$ as the final azimuth angle of the compass, if the approximate value $\overline{\theta}$ is within the overlapped range $(\theta_{CL2}, \theta_{CU1})$, $(\theta_{CL2} < \overline{\theta} < \theta_{CU1})$; selecting $\theta_{CL2}$ as the final azimuth angle of the compass, if the approximate value $\overline{\theta}$ is within a range $(\theta_{CL1}, \theta_{CL2})$, $(\theta_{CL1} < \overline{\theta} < \theta_{CL2})$; and selecting $\theta_{CU1}$ as the final azimuth angle of the compass, if the approximate value $\overline{\theta}$ is within a range $(\theta_{CU1}, \theta_{CU2})$, $(\theta_{CU1} < \overline{\theta} < \theta_{CU2})$.

15. A computer-readable recording medium storing a program executed by a computer, the program implementing a method according to claim 7.

16. An apparatus for determining a geomagnetic field by using a compass, comprising:

an allowable magnetic field range definition unit defining an allowable magnetic field range used to determine a valid geomagnetic region;

a magnetic field calculation unit calculating a magnitude of a magnetic field at a position of a compass-installed moving object;

a magnetic field comparison unit comparing the magnitude of the magnetic field to determine where or not the magnetic field is within the allowable magnetic field range; and a geomagnetic region determination unit, if the magnitude of the magnetic field is within the allowable magnetic field range, determining the position of a compass-installed moving object is within the valid geomagnetic region, and if not, determining that there is applied an external magnetic field disturbance at the position of a compass-installed moving object.

17. The apparatus according to claim 16, wherein the allowable magnetic field range definition unit comprises:
- a magnetic field detection unit detecting time trajectory of horizontal and vertical components (Hx, Hy) of the magnetic field in a predetermined geomagnetic region while the compass rotates, and calculating amplitudes and offsets of a geomagnetic field by using maximum and minimum values of the horizontal and vertical components of the magnetic field;
- a candidate position group generation unit, if the time trajectory of magnetic field has an approximately sinusoidal wave form, selecting a current position of the compass as a candidate position used to define the allowable magnetic-field range, and if not, changing the position of the compass to perform the detection of the magnetic field detection unit and the selection of the candidate position determination unit, and generating a candidate position group having a predetermined number of candidate positions; and
- an allowable magnetic field range obtaining unit obtaining the allowable magnetic-field range by calculating mean and variance values of the amplitudes and offsets of the geomagnetic fields at the candidate positions of the candidate position group; and calculating upper and lower limits of the magnitudes of the geomagnetic fields from the amplitudes and offsets.

18. The apparatus according to claim 17, wherein the candidate position group generation unit further comprises a candidate position elimination unit comparing the amplitudes and offsets of the geomagnetic fields at the candidate positions and eliminating candidate positions having more than predetermined amplitudes and offsets from the candidate position group.

19. The apparatus according to claim 16,
wherein the allowable magnetic field range definition unit defines at least two allowable magnetic field ranges for at least two compasses used to determine a valid geomagnetic region;
wherein the geomagnetic region determination unit, if the magnitude of the magnetic field is within the at least two allowable magnetic field ranges, determines that the position of a compass-installed moving object is within the valid geomagnetic region, and if not, determines that there is applied an external magnetic field disturbance at the position of a compass-installed moving object.

20. The apparatus according to claim 19,
wherein two compasses are used, and
wherein the geomagnetic region determination unit comprises:
- a first determination unit, if the magnitude of the magnetic field is not within one of the two allowable magnetic field ranges, determining that there is applied the external magnetic field disturbance at the position of the moving object; and
- a first validity determination unit, if the magnitude of the magnetic field is within both of the allowable magnetic field ranges, calculating a difference between magnitudes of magnetic fields detected by the two compasses, and if the difference is more than a predetermined value, determining that the geomagnetic fields of the compasses are not valid, and if not, determining that the geomagnetic fields of the compasses are valid.

21. The apparatus according to claim 20, wherein the first validity determination unit comprises:
- a second determination unit, if the magnitude of the magnetic field is within both of the allowable magnetic field ranges, calculating a difference between magnitudes of magnetic fields detected by the two compasses, and if the difference is more than a predetermined value, determining that the geomagnetic fields of the compasses are not valid; and
- a second validity determination unit, if the difference is not more than the predetermined value, calculating upper and lower limits of azimuth angles of the two compasses from data of the magnetic field detected by the two compasses, and determining whether or not the azimuth angles of the two compasses are valid by using upper and lower limits of the azimuth angles of the two compasses.

22. The apparatus according to claim 21, wherein the second validity determination unit comprises:
- a third determination unit, if two azimuth angle ranges of the two compasses are not overlapped, determining that the geomagnetic fields detected by the compasses are not valid; and
- a third validity determination unit, if two azimuth angle ranges of the two compasses are overlapped, determining that the geomagnetic fields detected by the compasses are valid.

23. The apparatus according to claim 16, wherein the apparatus further comprises a moving direction estimation unit estimating a moving direction of the moving object by using the azimuth angles detected by the compasses based on the result of the determination of the geomagnetic region determination unit.

24. An apparatus for determining an azimuth angle of an object by using two compasses, comprising:
- an azimuth angle detection unit, when geomagnetic fields detected by the two compasses are determined to be valid according to claim 16, detecting the azimuth angles by using the two compasses; and
- an azimuth angle determination unit determining a final azimuth angle of the compasses by averaging the azimuth angles.

25. An apparatus for determining an azimuth angle of an object by using two compasses, comprising:
- an orientation angle detection unit, when geomagnetic fields detected by the two compasses are determined to be valid according to claim 16, detecting the orientation angle of the object by using a gyro or odometer; and
- an 2nd azimuth angle determination unit determining a final azimuth angle of the compasses from a value closest to the orientation angle of the object,
wherein the final azimuth angle is determined from the value closest to the orientation angle of the object by:
defining the approximate value $\bar{\theta}$ represented by Equation 21:

$$\bar{\theta} \equiv \theta_c(t_{k-1}) + (\omega_g + \bar{b}) \cdot \Delta t, \quad \text{[Equation 21]}$$

wherein $\theta_c(t_{k-1})$ is an estimated azimuth angle of the compass or an estimated orientation angle of the object at a previous sampling time, $\omega_g$ is an angular velocity detected by a gyro or odometer, $\bar{b}$ is an estimated bias of the gyro, and $\Delta t$ is a sampling time; and
when the two real azimuth angle ranges represented by Equation 20 are overlapped, $$\theta_{CLi} \leq \hat{\theta}_{ci} \leq \theta_{CUi} (\theta_{CL1} < \theta_{CL2}, \theta_{CU1} < \theta_{CU2}) \quad \text{[Equation 20]}$$

selecting $\bar{\theta}$ as the final azimuth angle of the compass, if the approximate value $\bar{\theta}$ is within the overlapped range $(\theta_{CL2}, \theta_{CU1})$, $(\theta_{CL2} < \bar{\theta} < \theta_{CU2})$; selecting $\theta_{CL2}$ as the final azimuth angle of the compass, if the approximate value $\bar{\theta}$ is within a range $(\theta_{CL1}, \theta_{CL2})$, $(\theta_{CL1} < \bar{\theta} < \theta_{CL2})$; and selecting $\theta_{CU1}$ as the final azimuth angle of the compass, if the approximate value $\bar{\theta}$ is within a range $(\theta_{CU1}, \theta_{CU2})$, $(\theta_{CU1} < \bar{\theta} < \theta_{CU2})$.

* * * * *